United States Patent (10) Patent No.: US 8,657,712 B2
Tamai et al. (45) Date of Patent: Feb. 25, 2014

(54) MULTI-SPEED DRIVE UNIT

(75) Inventors: Goro Tamai, West Bloomfield, MI (US);
Dumitru Puiu, Sterling Heights, MI
(US); Scott A. Miller, Northville, MI
(US)

(73) Assignee: Chrysler Group LLC, Auburn Hills, MI
(US)

( * ) Notice: Subject to any disclaimer, the term of this
patent is extended or adjusted under 35
U.S.C. 154(b) by 502 days.

(21) Appl. No.: 12/882,943

(22) Filed: Sep. 15, 2010

(65) Prior Publication Data
US 2012/0065016 A1 Mar. 15, 2012

(51) Int. Cl.
*F16H 3/72* (2006.01)
*F16H 3/44* (2006.01)

(52) U.S. Cl.
USPC .............................. 475/5; 475/302

(58) Field of Classification Search
USPC ............. 475/5, 207, 218, 219, 302, 149, 150
See application file for complete search history.

(56) References Cited

U.S. PATENT DOCUMENTS

| | | | |
|---|---|---|---|
| 5,845,731 A | 12/1998 | Buglione et al. | |
| 5,931,757 A | 8/1999 | Schmidt | |
| 6,090,005 A | 7/2000 | Schmidt et al. | |
| 6,344,008 B1 | 2/2002 | Nagano et al. | |
| 6,478,705 B1 | 11/2002 | Holmes et al. | |
| 6,527,659 B1 | 3/2003 | Klemen et al. | |
| 6,793,600 B2 * | 9/2004 | Hiraiwa | 475/5 |
| 6,811,508 B2 * | 11/2004 | Tumback | 475/5 |
| 6,852,054 B2 * | 2/2005 | Tumback et al. | 475/5 |
| 6,862,887 B2 | 3/2005 | Noreikat et al. | |
| 6,893,373 B2 | 5/2005 | Kawamoto et al. | |
| 7,192,373 B2 | 3/2007 | Bucknor et al. | |
| 7,217,211 B2 | 5/2007 | Klemen et al. | |
| 7,261,660 B2 | 8/2007 | Sowul et al. | |
| 7,278,941 B2 | 10/2007 | Holmes et al. | |
| 7,367,910 B2 | 5/2008 | Schmidt | |
| 7,632,201 B2 | 12/2009 | Takami et al. | |
| 7,678,005 B2 | 3/2010 | Tuckfield | |
| 7,749,131 B2 | 7/2010 | Imamura et al. | |
| 2009/0011887 A1 | 1/2009 | Komada et al. | |
| 2009/0170649 A1 | 7/2009 | Murakami et al. | |
| 2009/0176610 A1 | 7/2009 | Conlon | |
| 2010/0032217 A1 * | 2/2010 | Katsuta et al. | 180/65.23 |
| 2010/0180722 A1 | 7/2010 | Sasaki | |
| 2010/0203996 A1 | 8/2010 | Kawai et al. | |
| 2012/0065014 A1 * | 3/2012 | Puiu et al. | 475/5 |
| 2012/0065015 A1 * | 3/2012 | Tamai et al. | 475/5 |

* cited by examiner

*Primary Examiner* — Roger Pang
(74) *Attorney, Agent, or Firm* — Ralph E. Smith

(57) ABSTRACT

A multi-speed drive unit is provided for an electrically variable transmission having a variable-range output gear ratio for a motor vehicle. The variable-range output electrically variable transmission has improved final drive gear ratios that allow the motor to be operated in its desired efficiency and/or performance range during both city and highway vehicle operation. Further, the variable-range output electrically variable transmission allows for increased vehicle speeds during electric vehicle operation and provides for the use of the vehicle engine during reverse gear operation.

8 Claims, 5 Drawing Sheets

|  | C1 | C2 | NOTES |
| --- | --- | --- | --- |
| HEV W/ ENGINE ON, FIRST GEAR RATIO | ON | OFF | VRO-EVT, FIRST GEAR RATIO |
| HEV W/ ENGINE ON, SECOND GEAR RATIO | OFF | ON | VRO-EVT, SECOND GEAR RATIO |
| HEV IN EV1 | ON | OFF | 2spd EV AS EVT, FIRST GEAR RATIO |
| HEV IN EV2 | OFF | ON | 2spd EV AS EVT, SECOND GEAR RATIO |

FIG. 4

| | C1 | C2 | C3 | C4 | NOTES |
|---|---|---|---|---|---|
| HEV, FIRST GEAR RATIO | ON | OFF | OFF | ON | VRO-EVT, FIRST GEAR RATIO |
| HEV, SECOND GEAR RATIO | OFF | ON | OFF | ON | VRO-EVT, SECOND GEAR RATIO |
| ReEV AS BEV1 | ON | OFF | OFF | OFF | 2spd BEV, FIRST GEAR RATIO |
| ReEV AS BEV2 | OFF | ON | OFF | OFF | 2spd BEV, SECOND GEAR RATIO |
| ReEV AS BEV3 | ON | OFF | OFF | ON | 2spd EV AS EVT, FIRST GEAR RATIO |
| ReEV AS BEV4 | OFF | ON | OFF | ON | 2spd EV AS EVT, SECOND GEAR RATIO |
| ReEV AS SERIES, FIRST GEAR RATIO | ON | OFF | ON | OFF | 2spd BEV W/ MotA GENERATING, FIRST GEAR RATIO |
| ReEV AS SERIES, SECOND GEAR RATIO | OFF | ON | ON | OFF | 2spd BEV W/ MotA GENERATING, SECOND GEAR RATIO |
| ReEV AS EVT HEV, FIRST GEAR RATIO | ON | OFF | OFF | ON | VRO-EVT, FIRST GEAR RATIO |
| ReEV AS EVT HEV, SECOND GEAR RATIO | OFF | ON | OFF | ON | VRO-EVT, SECOND GEAR RATIO |
| BEV | DEL | DEL | DEL | DEL | ADDITIONAL FD GEARSET |

FIG. 6

MULTI-SPEED DRIVE UNIT

FIELD OF THE INVENTION

Embodiments disclosed herein relate generally to a transmission for a motor vehicle, and more particularly, to an electrically variable transmission having a variable-range output.

BACKGROUND OF THE INVENTION

A multi-mode electrically variable transmission is an advantageous new transmission design that has the ability to reduce engine and electric motor losses at low as well as high vehicle speeds. However, depending on the implementation of the mode-changing mechanism, a multi-mode electrically variable transmission ("multi-mode EVT") has potential disadvantages. For example, a multi-mode EVT may experience increased electric motor losses at higher vehicle speeds ("mechanical point chasing") and higher transmission spin losses due to clutch drag and planetary gear set friction. Further, the gearing range within some multi-mode EVTs may limit the electric vehicle ("EV") drive capabilities.

A simplified illustration of mechanical point chasing in FIG. 1. shows the rotations per minute ("RPM") of a first electric motor A, second electric motor B, and engine of a typical prior art single-mode electrically variable transmission plotted against the output rotations per minute of the final drive. As can be seen in FIG. 1, the engine RPM ("ENGINE") remain constant as the final drive RPM increases until the final drive RPM reaches N1. Meanwhile, the RPM of electric motor B ("MOT B") increases proportionally with the final drive RPM. In contrast to electric motor B, the RPM of electric motor A ("MOT A") decreases proportionally with the final drive RPM and is equal to zero at a final drive RPM of N1. Once the RPM of electric motor A reaches small negative values (0 rpm used in this simplified example), any further decrease in RPM of electric motor A results in correspondingly increased system losses. Thus, typical single-mode EVT transmissions will not allow electric motor A to operate at (very) negative RPM. The rotation speed of the engine must account for the lack of a further decline (into negative) of RPM of electric motor A above final drive RPM of N1. Thus, at final drive RPM above N1, the engine RPM must increase proportionally with the increase in the final drive RPM. An increase in engine RPM likely results in the engine operating out of its optimum fuel efficiency or power range, or both. Thus, it becomes necessary to design the gearing of the EVT transmission to compromise between adequate highway (i.e., high-speed) and city (i.e., low-speed) performance and efficiency. Thus, a desirable EVT keeps the engine operating within its efficiency and/or power range while still providing satisfactory city and highway performance, while also being compactly implementable with a low loss mode-change mechanism.

In addition, because the gearing of the EVT must be designed with the compromise between city and highway driving in mind, the gearing of the EVT will often be higher than desirable for city driving in order to achieve adequate vehicle speeds during highway driving. Therefore, the electric motors of the EVT often must provide higher torque levels than necessary for city driving to overcome the taller final drive ratio of the EVT. Higher torque electric motors are typically larger and more expensive than lower torque models. At the same time, because of the compromise between city and highway driving, the final drive ratio is not optimum for purely electric operation. When operating purely under battery power without the propulsive force from the engine, the maximum final drive speed is limited by the component speeds of the planetary gear set within the EVT. Under purely electric power, EVTs typically have a limited top speed resulting from the city and highway gearing compromise. Thus, a desirable EVT allows for a shorter final drive ratio so that smaller and less powerful electric motors may be used as well as a taller final drive ratio that allows for adequate vehicle speeds during electric vehicle operation.

An EVT generally has limited reverse gear operation and relies solely upon electric motors to provide reverse propulsion. This is problematic during situations in which electric battery power or electric motor torque may be limited such as in extremely hot or cold climates. If electric power fails or provides inadequate propulsive force, the vehicle is simply unable to move in reverse. Thus, a desirable EVT harnesses the propulsive force of the engine for reverse gear operation or uses both electric motors of the EVT for reverse gear operation if battery power is adequate.

It is, therefore, desirable to provide an EVT that keeps the engine operating within its efficiency and/or power range while also providing for satisfactory city and highway performance. It is, therefore, also desirable to provide an EVT that allows for lower torque motors to be used within the transmission while still achieving satisfactory city performance and adequate speeds during EV operation. It is also desirable to provide an EVT in which the engine may provide propulsive force for reverse gear operation.

BRIEF SUMMARY OF THE INVENTION

In an example embodiment, a transmission is provided. The transmission has a planetary gear set having a sun gear, at least two pinion gears continuously meshed with the sun gear, and a ring gear continuously meshed with the at least two pinion gears. The at least two pinion gears are coupled to an engine by a carrier. The transmission also has a first electric motor coupled to the sun gear and a second electric motor coupled to the ring gear. The transmission further has first and second driver gears. The second electric motor is selectively coupled to the first driver gear to provide a first overall transmission gear ratio and selectively coupled to the second driver gear to provide a second overall transmission gear ratio.

In another example embodiment, another transmission is provided. The transmission has a planetary gear set having a sun gear, at least two pinion gears continuously meshed with the sun gear, and a ring gear continuously meshed with the at least two pinion gears. The transmission also has a first electric motor coupled to the sun gear, and a second electric motor coupled to the ring gear. The second electric motor is selectively coupled by a first clutch mechanism to a first driver gear and the second electric motor is also selectively coupled by a second clutch mechanism to a second driver gear. The at least two pinion gears are coupled to an engine by a carrier. The transmission also has an output layshaft having a first final drive pinion coupled to the output layshaft and continuously meshed with the first driver gear, a second final drive pinion coupled to the output layshaft and continuously meshed with the second driver gear and an output gear coupled to the output layshaft.

In another example embodiment, an electrically variable transmission is provided. The electrically variable transmission has a transmission input shaft, a final drive output, a first electric motor and a second electric motor. The electrically variable transmission also has a first output gear ratio and a second output gear ratio. The first electric motor and second electric motor are selectively coupled to the first output gear ratio to provide a first output gear ratio for the electrically variable transmission, and the first electric motor and second electric motor are selectively coupled to the second output gear ratio to provide a second output gear ratio for the electrically variable transmission.

Disclosed is a multi-speed drive unit for an electrically variable transmission having a variable-range output gear ratio for a motor vehicle. The electrically variable transmission has improved final drive gear ratios that allow a motor to be operated in its desired efficiency and/or performance range during both city and highway vehicle operation. Further, the electrically variable transmission allows for increased vehicle speeds during electric vehicle operation and provides for the use of the vehicle engine during reverse gear operation.

BRIEF DESCRIPTION OF THE DRAWINGS

The technology is illustrated and described herein with reference to the various drawings, in which like reference numbers denote like method steps and/or system components, and in which:

FIG. 4 is a table listing the operating modes and corresponding clutch activation states of the transmission of FIG. 2;

FIG. 6 is a table listing the operating modes and corresponding clutch activation states of the transmission of FIG. 5.

DETAILED DESCRIPTION OF THE PREFERRED EMBODIMENTS

Figure 2:
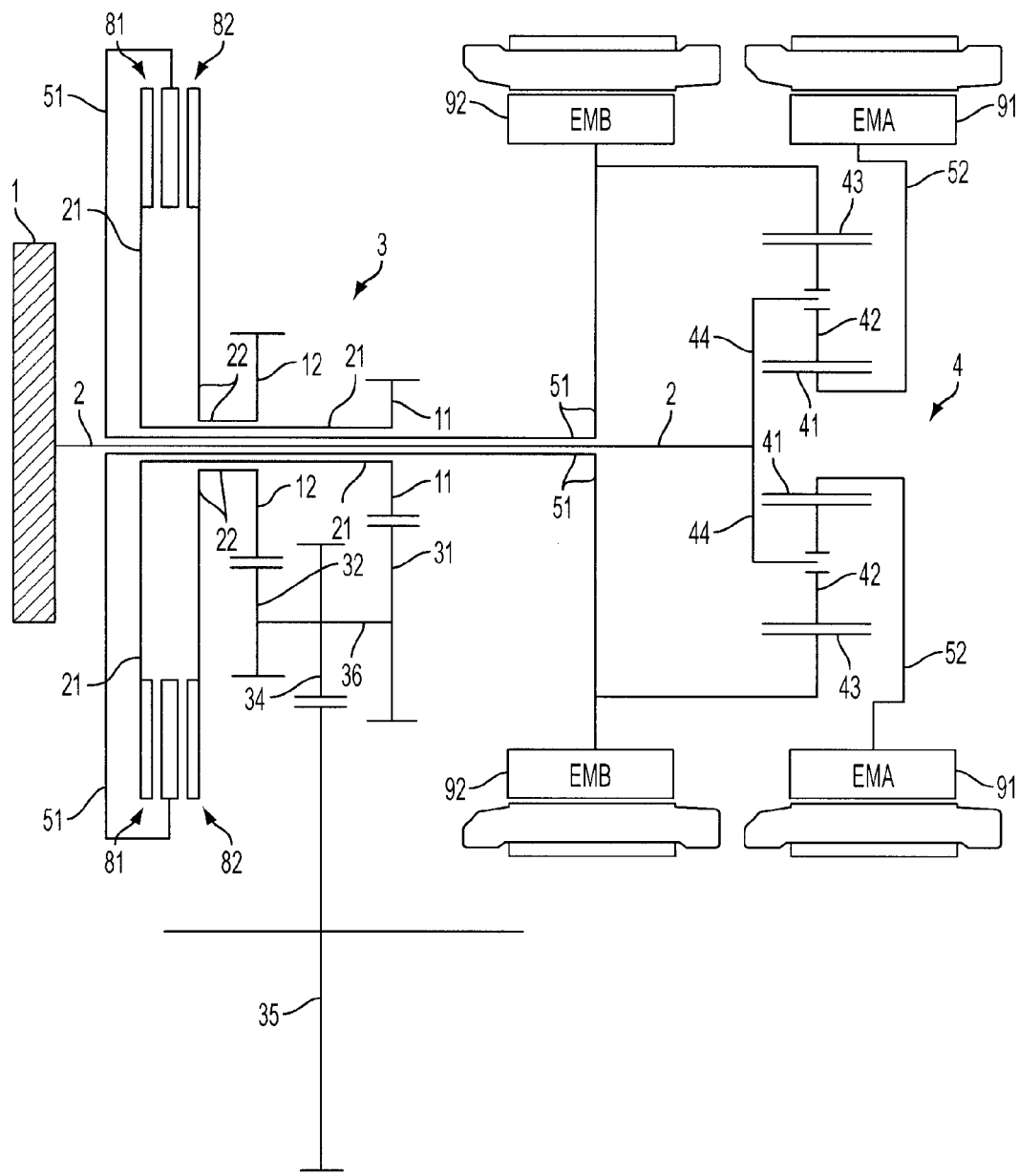
FIG. 2 is a drawing of an example variable-range-output electrically variable transmission having a multi-range gearing mechanism incorporated between the ring gear of an input-split planetary gear set and a final drive output according to an embodiment disclosed herein.

FIG. 2 is a drawing of an example variable-range-output electrically variable transmission ("VRO-EVT") having a multi-range gearing mechanism 3 incorporated between the ring gear 43 of an input-split planetary gear set 4 and a final drive output 35 according to an embodiment disclosed herein. The VRO-EVT disclosed in FIG. 2 is shown at an exemplary cross-section.

The VRO-EVT includes a transmission input shaft 2 coupled to a vehicle engine or other propulsion source 1 ("engine") and a carrier 44 of the input-split planetary gear set 4. The input-split planetary gear set 4 is a conventional planetary gear set as would be readily understood by one of ordinary skill in the art. At least two, and possibly more, pinion gears 42 are rotatably mounted upon the carrier 44 of the input-split planetary gear set 4. Each pinion gear 42 is continuously meshed with a sun gear 41 of the input-split planetary gear set 4. A ring gear 43 of the input-split planetary gear set 4 is continuously meshed with each pinion gear 42.

The sun gear 41 is coupled by a shaft 52 to an electric motor A 91 ("EMA"). The ring gear 43 is coupled to an electric motor B 92 ("EMB"). The ring gear 43 and EMB 92 are also coupled by shaft 51 to a first clutch mechanism 81 and a second clutch mechanism 82. In one embodiment, the shaft 51 is concentric with the transmission input shaft 2. The first clutch mechanism 81 is coupled to a first output shaft 21 that, in one embodiment, is concentric with the transmission input shaft 2 and shaft 51. The first output shaft 21 is also coupled to a first driver gear 11. When the first clutch mechanism 81 is activated, the first clutch mechanism 81 couples the shaft 51 to the first output shaft 21, thereby locking the ring gear 43, EMB 92, shaft 51, first clutch mechanism 81, first output shaft 21, and first output driver gear 11 in synchronous rotation. The second clutch mechanism 82 is coupled to a second output shaft 22 that, in one embodiment, is concentric with the transmission input shaft 2, shaft 51 and first output shaft 21. The second output shaft 22 is also coupled to a second driver gear 12. When the second clutch mechanism 82 is activated, the second clutch mechanism 82 couples the shaft 51 to the second output shaft 22, thereby locking the ring gear 43, EMB 92, shaft 51, second clutch mechanism 82, second output shaft 22, and second output driver gear 12 in synchronous rotation. In one embodiment, the first driver gear 21 and second driver gear 22 may be selectively coupled to shaft 51 by a synchronizer mechanism.

The VRO-EVT also includes an output layshaft 36 parallel to the transmission input shaft 2. A first final drive pinion 31, second final drive pinion 32 and output gear 34, are each coupled to the output layshaft 36. The first final drive pinion 31 is continuously meshed with the first driver gear 11. The second final drive pinion 32 is continuously meshed with the second driver gear 12. The first driver gear 11 and first final drive pinion 21 achieve a first output gear ratio. The second driver gear 12 and second final drive pinion 22 achieve a second output gear ratio. The first output gear ratio and second output gear ratio may be selected to be any desired under/overdrive ratio for either gear range. The first output gear ratio and second output gear ratio may be adjusted by selecting corresponding pairs of the first driver gear 11/first final drive pinion 21 and the second driver gear 12/second final drive pinion 22 to achieve the desired gear ratios. In one embodiment, the first driver gear 11/first final drive pinion 21 combination may be replaced by a first planetary gear set to achieve the first output gear ratio and the second driver gear 12/second final drive pinion 22 combination may be replaced by a second planetary gear set to achieve the second output gear ratio. The output gear 34 is continuously meshed with a final drive output 35 or other mechanism to output propulsive force from the VRO-EVT.

FIG. 4 is a table listing the operating modes and corresponding clutch activation states of the transmission of FIG. 2. The first clutch mechanism 81 ("C1") and second clutch mechanism 82 ("C2") may be selectively activated to achieve the different operating states of the VRO-EVT. "On" indicates that the clutch has been activated, thereby coupling together all components to which it is attached as discussed above. "Off" indicates that the clutch has been deactivated, thereby allowing the components to which it is attached to rotate independent of one another. Referring again to FIGS. 2 and 4, when the VRO-EVT is to be operated as a hybrid electric vehicle ("HEV") with a combination of propulsive force from the engine 1 and EMB 92 with EMA 91 generating electrical power in a first gear ratio, the first clutch mechanism 81 is activated and the second clutch mechanism 82 is deactivated. Thus, propulsive force passes through the first clutch mechanism 81, first output shaft 21, and first driver gear 11 to the first final drive pinion 31, output layshaft 36, output gear 34, and on to the final drive output 35. When the VRO-EVT is to be operated as a HEV with a combination of propulsive force from the engine 1 and EMB 92 with EMA 91 generating electrical power in a second gear ratio, the first clutch mechanism 81 is deactivated and the second clutch mechanism 82 is activated. Thus, propulsive force passes through the second clutch mechanism 82, second output shaft 22, and second driver gear 12 to the second final drive pinion 32, output layshaft 36, output gear 34, and on to the final drive output 35.

The VRO-EVT may be operated in a HEV such that propulsive force is generated exclusively by EMB 92 using power from a battery or some other source ("EV"). For operation of the VRO-EVT in a HEV-EV mode in a first gear ratio ("EV1"), the first clutch mechanism 81 is activated and the second clutch mechanism 82 is deactivated. Thus, propulsive force passes through the first clutch mechanism 81, first output shaft 21, and first driver gear 11 to the first final drive pinion 31, output layshaft 36, output gear 34, and on to the final drive output 35. For operation of the VRO-EVT in a HEV-EV mode in a second gear ratio ("EV2"), the first clutch mechanism 81 is deactivated and the second clutch mechanism 82 is activated. Thus, propulsive force passes through the second clutch mechanism 82, second output shaft 22, and second driver gear 12 to the second final drive pinion 32, output layshaft 36, output gear 34, and on to the final drive output 35.

Figure 1:
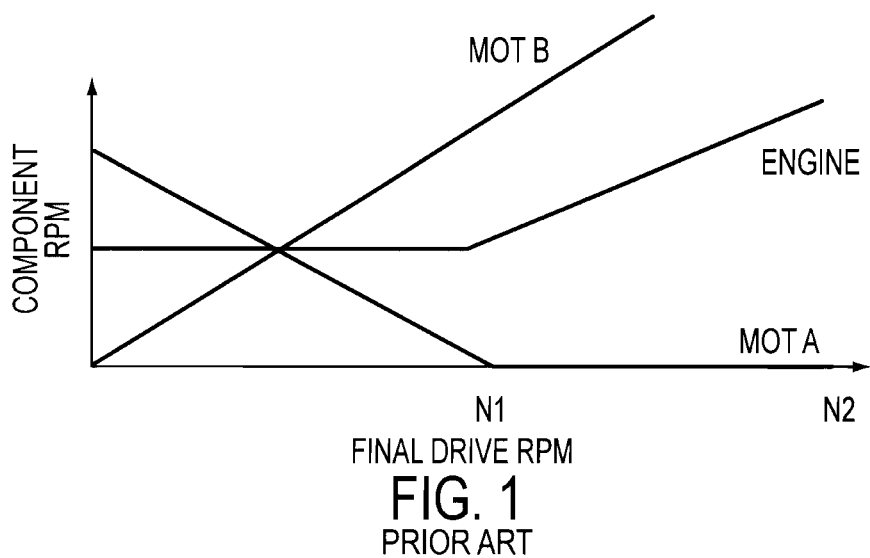
FIG. 1 is a graph showing the rotations per minute of a first electric motor, second electric motor, and engine of a typical prior art single-mode electrically variable transmission plotted against the output rotations per minute of the final drive.
Figure 3:
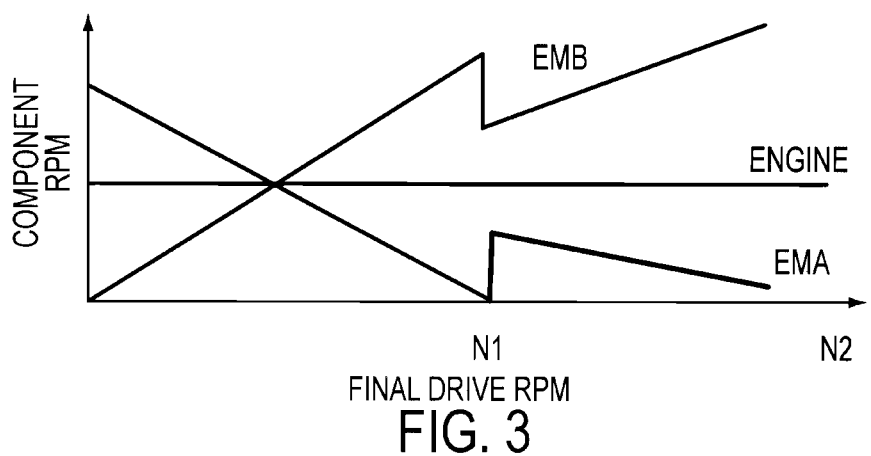
FIG. 3 is a graph showing the rotations per minute of a first electric motor, second electric motor, and engine of the transmission of FIG. 2 plotted against the output rotations per minute of the final drive.

FIG. 3 is a graph showing the rotations per minute of a first electric motor, second electric motor, and engine of the transmission of FIG. 2 plotted against the output rotations per minute of a final drive. FIG. 3 shows the operation of the VRO-EVT using the first driver gear 11/first final drive pinion 31 ("first output gear ratio") for final drive RPM less than N1 and using the second driver gear 12/second final drive pinion 32 ("second output gear ratio") for final drive RPM greater than N1. As can be seen, the engine 1 RPM ("ENGINE") remains constant as the final drive RPM increases until the final drive RPM reaches N1. The RPM of EMB 92 ("MOT B") increases proportionally with the final drive RPM. In contrast to EMB 92, the RPM of EMA 91 ("MOT A") decreases proportionally with the final drive RPM and is equal to zero at a final drive RPM of N1. However, in contrast to the EVT of FIG. 1, in the disclosed VRO-EVT, once the RPM of EMA 91 reaches 0, the first clutch mechanism 81 is deactivated and the second clutch mechanism 82 is activated. The change in the activation states switches the VRO-EVT from operation in the first output gear ratio to operation in the second output gear ratio. The corresponding change in gear ratios causes the RPM of EMA 91 to increase and the RPM of EMB 92 to decrease. All the while, the RPM of the engine 1 remains unchanged. At final drive RPM above N1, the RPM of the engine 1 remains constant while the RPM of EMB 92 increases in proportion to the final drive RPM and the RPM of EMA 91 decreases in proportion to the final drive RPM. However, because of the gearing switch that occurred at N1, the RPM of EMA 91 does not become negative until final drive RPM substantially higher than N1. This enables the engine 1 to operate more efficiently and decreases losses within the transmission.

Figure 5:
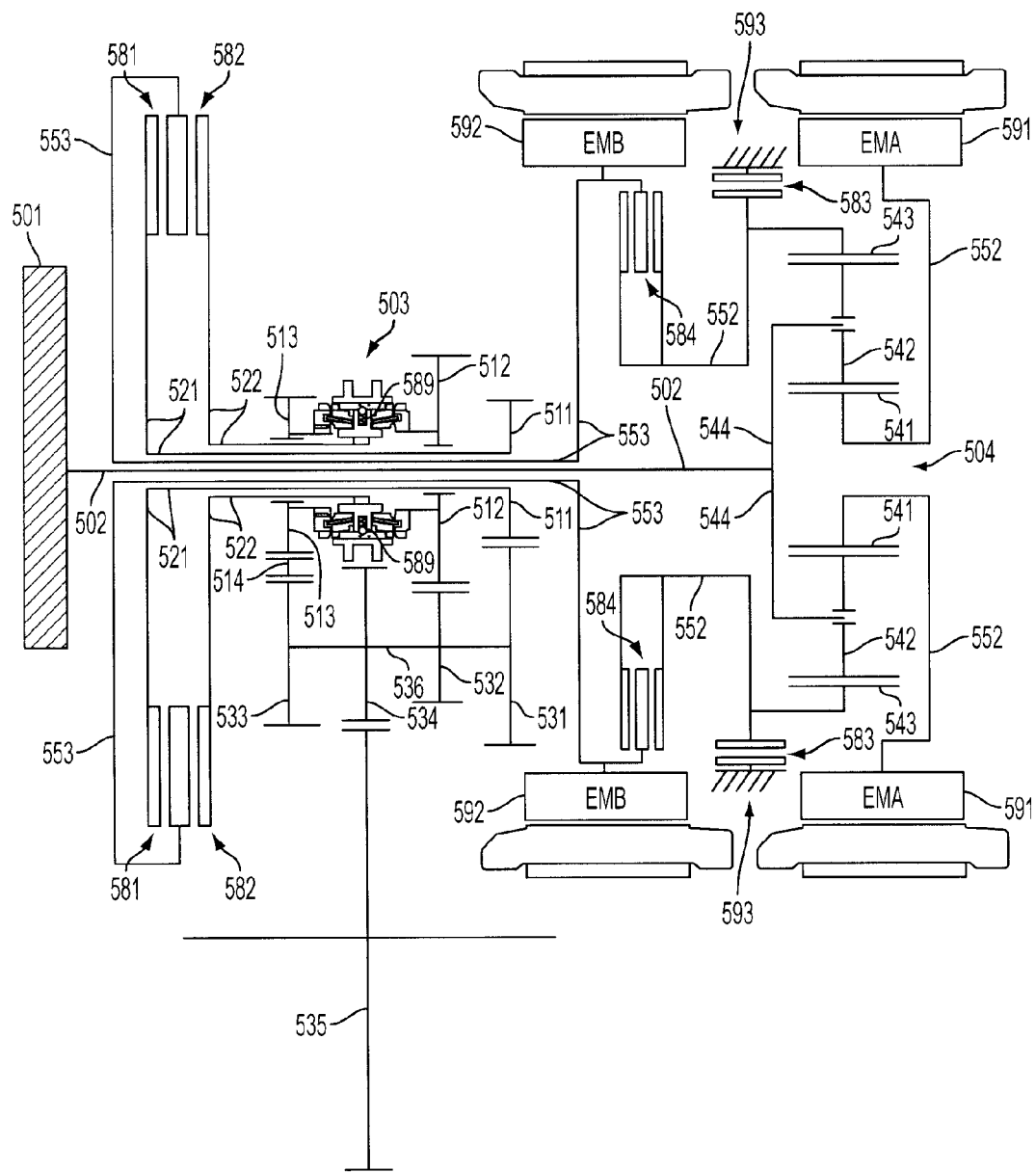
FIG. 5 is a drawing of an example variable-range-output electrically variable transmission having a multi-range gearing mechanism incorporated between the ring gear of an input-split planetary gear set and a final drive output according to another embodiment disclosed herein.

FIG. 5 is a drawing of an example variable-range-output electrically variable transmission ("VRO-EVT") having a multi-range gearing mechanism 503 incorporated between a ring gear 543 of the input-split planetary gear set 504 and a final drive output 535 according to another embodiment disclosed herein. The VRO-EVT disclosed in FIG. 5 is shown at an exemplary cross-section. The input-split planetary gear set 504 is a conventional planetary gear set as would be readily understood by one of ordinary skill in the art. The VRO-EVT of the FIG. 5 embodiment includes a transmission input shaft 502 coupled to a vehicle engine or other propulsion source 501 ("engine") and a carrier 544 of the input-split planetary gear set 504. At least two, and possibly more, pinion gears 542 are rotatably mounted upon the carrier 544. Each pinion gear 542 is continuously meshed with a sun gear 541 of the input-split planetary gear set 504. The ring gear 543 of the input-split planetary gear set 504 is continuously meshed with each pinion gear 542.

The sun gear 541 is coupled by a shaft 552 to an electric motor A 591 (EMA). The ring gear 543 is coupled to a shaft 552 that is concentric with the transmission input shaft 502. The shaft 552 is coupled to a third clutch mechanism 583 and a fourth clutch mechanism 584. The third clutch mechanism 583 selectively brakes and stops rotation of the shaft 552 and ring gear 543. The fourth clutch mechanism 584 selectively couples an electric motor B 592 (EMB) to the shaft 552. EMB 592 is also coupled to a shaft 553. The shaft 553 is also coupled to a first clutch mechanism 581 and a second clutch mechanism 582. In one embodiment, the shaft 553 is concentric with the transmission input shaft 502.

The first clutch mechanism 581 is coupled to a first output shaft 521 that, in one embodiment, is concentric with the transmission input shaft 502 and shaft 553. The first output shaft 521 is also coupled to a first driver gear 511. When the first clutch mechanism 581 is activated, the first clutch mechanism 581 couples the shaft 553 to the first output shaft 521, thereby locking EMB 592, shaft 553, first clutch mechanism 581, first output shaft 521, and first output driver gear 511 in synchronous rotation. When the fourth clutch mechanism 584 is activated along with the first clutch mechanism 581, the ring gear 543, EMB 592, shaft 553, first clutch mechanism 581, first output shaft 521, and first output driver gear 511 are locked together in synchronous rotation.

The second clutch mechanism 582 is coupled to a second output shaft 522 that, in one embodiment, is concentric with the transmission input shaft 502 and shaft 553. A second driver gear 512 and a reverse driver gear 513 are rotatably coupled to the second output shaft 522. The second driver gear 512 and reverse driver gear 513 are concentric with the second output shaft 522 and free to rotate upon it. Also coupled to the second output shaft 522 is a synchronizer mechanism 589. The synchronizer mechanism 589 is non-rotatably mounted to and concentric with the second output shaft 522 and is located between the second driver gear 512 and the reverse driver gear 513. When the second clutch mechanism 582 is activated, the second clutch mechanism 582 couples the shaft 553 to the second output shaft 522, thereby fixedly locking EMB 592, shaft 553, second clutch mechanism 582, second output shaft 522, and synchronizer mechanism 589 in synchronous rotation. When the fourth clutch mechanism 584 is activated along with the second clutch mechanism 582, the ring gear 543, EMB 592, shaft 553, second clutch mechanism 582, second output shaft 522 and synchronizer mechanism 589 are all locked together in synchronous rotation. The synchronizer mechanism 589 may be moved towards the second driver gear 512 or reverse driver gear 513 longitudinally along the second output shaft 522 to selectively lock one of the second driver gear 512 or reverse driver gear 513 in synchronous rotation with the second output shaft 522. To lock the second driver gear 512 to the second output shaft 522, the synchronizer mechanism 589 is moved longitudinally along the second output shaft 522 in the direction of the second driver gear 512 until the synchronizer mechanism 589 contacts the second driver gear 512. To lock the reverse driver gear 513 to the second output shaft 522, the synchronizer mechanism 589 is longitudinally moved along the second output shaft 522 in the direction of the reverse driver gear 513 until the synchronizer mechanism 589 contacts the reverse driver gear 513. In one embodiment of the VRO-EVT, the second driver gear 512 may be fixedly attached to the second output shaft 522 and the reverse driver gear 513 and synchronizer mechanism may be omitted altogether.

The VRO-EVT also includes an output layshaft 536 parallel to the transmission input shaft 502. A first final drive pinion 531, second final drive pinion 532, reverse final drive pinion 533 and output gear 534, are each coupled to the output layshaft 536. The first final drive pinion 531 is continuously meshed with the first driver gear 511. The second final drive pinion 532 is continuously meshed with the second driver gear 512. The reverse final drive pinion 533 is continuously meshed with a reverse idler gear 514 that is continuously meshed with the reverse driver gear 513.

The first driver gear 511 and first final drive pinion 521 achieve a first output gear ratio. The second driver gear 512 and second final drive pinion 522 achieve a second output gear ratio. The reverse driver gear 513, reverse idler gear 514, and reverse final drive pinion 531 achieve a reverse or third output gear ratio. The first output gear ratio and second output gear ratio may be selected to be any desired under/overdrive ratio for either gear range. Likewise, the reverse/third output gear ratio may be selected to be any desired gear ratio. In one embodiment, the first driver gear 511/first final drive pinion 521 combination may be replaced by a first planetary gear set to achieve the first output gear ratio, the second driver gear 512/second final drive pinion 522 combination may be replaced by a second planetary gear set to achieve the second output gear ratio, and the reverse driver gear 513/reverse idler gear 514/reverse final drive pinion 531 may be replaced by a reverse/third planetary gear set to achieve the reverse/third output gear ratio. The first output gear ratio and second output gear ratio may be adjusted by selecting corresponding pairs of the first driver gear 511/first final drive pinion 521 and the second driver gear 512/second final drive pinion 522 to achieve the desired gear ratios. The reverse/third output gear ratio may be adjusted by selecting corresponding reverse driver gear 513/reverse idler gear 514/reverse final drive pinion 531 to achieve the desired gear ratios. The output gear 534 is continuously meshed with a final drive output 535 or other mechanism to output propulsive force from the VRO-EVT.

The first clutch mechanism 581, second clutch mechanism 582, third clutch mechanism 583 and fourth clutch mechanism 584 may be selectively activated to achieve different operating states of the disclosed VRO-EVT. For instance, the first clutch mechanism 581, second clutch mechanism 582, third clutch mechanism 583 and fourth clutch mechanism 584 may be selectively operated to permit the VRO-EVT to operate as a hybrid-electric vehicle (HEV), plug-in hybrid-electric vehicle (PHEV), range-extended electric vehicle (ReEV) and/or battery electric vehicle ("BEV"). When operating as a ReEV, the VRO-EVT may have three or more operating configurations. For instance, the clutches 581, 582, 583, 584 may be selectively activated to permit operation as a purely electric powered VRO-EVT. In another clutch state, the clutches 581, 582, 583, 584 of VRO-EVT may be selectively activated so as to permit operation as a series hybrid in which the engine 501 causes EMA 591 to rotate and generate electricity that is then used to power EMB 592 and rotate the shaft 553. In yet another clutch state, the clutches 581, 582, 583, 584 of VRO-EVT may be selectively activated so as to operate the VRO-EVT in a parallel hybrid configuration in which EMB 592 and the engine 501 provide a portion of the propulsive force to rotate shaft 553.

FIG. 6 is a table listing the operating modes and corresponding clutch activation states of the transmission of FIG. 5. The first clutch mechanism 581 ("C1"), second clutch mechanism 582 ("C2"), third clutch mechanism 583 ("C3"), and fourth clutch mechanism 584 ("C4") may be selectively activated to achieve the different operating states of the VRO-EVT. Referring again to FIGS. 5 and 6, when the VRO-EVT is to be operated as a HEV with a combination of propulsive force from the engine 501 and EMB 592 with EMA 591 generating electrical power, the third clutch mechanism 583 is deactivated and the fourth clutch mechanism 584 is activated. Thus, propulsive force passes from the engine 501 through shaft 502, input-split planetary gear set 4, shaft 552 and fourth clutch assembly 584. At the fourth clutch mechanism 584, EMB 592 supplements the propulsive force from the engine 501 and the propulsive force passes through shaft 553 to the first clutch mechanism 581 and second clutch mechanism 582. This clutch activation state of the third clutch mechanism 583 and fourth clutch mechanism 584 configures the VRO-EVT for HEV operation. At this point, for operation of the VRO-EVT in a HEV in a first gear ratio, the first clutch mechanism 581 is activated and the second clutch mechanism 582 is deactivated. Thus, propulsive force passes through the first clutch mechanism 581, first output shaft 521, and first driver gear 511 to the first final drive pinion 531, output layshaft 536, output gear 534, and on to the final drive output 535. For operation of the VRO-EVT in a HEV in a second gear ratio, the first clutch mechanism 581 is deactivated and the second clutch mechanism 582 is activated. In addition, the synchronizer mechanism 589 is moved longitudinally along the second output shaft 522 and into contact with the second driver gear 512, thereby non-rotatably affixing the second driver gear 512 to the second output shaft 522. Thus, propulsive force passes through the second clutch mechanism 582, second output shaft 522, synchronizer mechanism 589 and second driver gear 512 to the second final drive pinion 532, output layshaft 536, output gear 534, and on to the final drive output 535. For operation of the VRO-EVT in a HEV in reverse (not shown), the first clutch mechanism 581 is deactivated and the second clutch mechanism 582 is activated. In addition, the synchronizer mechanism 589 is moved longitudinally along the second output shaft 522 and into contact with the reverse driver gear 513, thereby non-rotatably affixing the reverse driver gear 513 to the second output shaft 522. Thus, propulsive force passes through the second clutch mechanism 582, second output shaft 522, synchronizer mechanism 589 and reverse driver gear 513 to the reverse idler gear 514, reverse final drive pinion 533, output layshaft 536, output gear 534, and on to the final drive output 535.

The VRO-EVT may also be configured for use in a range-extended electric vehicle ("ReEV"). In a ReEV, the propulsive force for the vehicle is typically provided by electric motors using energy supplied by a battery. When the battery becomes depleted, a gasoline or other fuel powered engine typically is engaged to provide propulsive force and/or electricity to power the electric motor. Still referring to FIGS. 5 and 6, when the VRO-EVT is to be operated in a ReEV as a BEV utilizing only battery power, the third clutch mechanism 583 and fourth clutch mechanism 584 are deactivated. This clutch activation state of the third clutch mechanism 583 and fourth clutch mechanism 584 configures the VRO-EVT for BEV use in a ReEV. In this configuration, propulsive force is provided solely by EMB 592 and travels through shaft 553 to the first clutch mechanism 581 and second clutch mechanism 582. At this point, for operation of the VRO-EVT in a ReEV-BEV mode in a first gear ratio ("ReEV as BEV1"), the first clutch mechanism 581 is activated and the second clutch mechanism 582 is deactivated. Thus, propulsive force passes through the first clutch mechanism 581, first output shaft 521, and first driver gear 511 to the first final drive pinion 531, output layshaft 536, output gear 534, and on to the final drive output 535. For operation of the VRO-EVT in a ReEV-BEV mode in a second gear ratio ("ReEV as BEV2"), the first clutch mechanism 581 is deactivated and the second clutch mechanism 582 is activated. In addition, the synchronizer mechanism 589 is moved longitudinally along the second output shaft 522 and into contact with the second driver gear 512, thereby non-rotatably affixing the second driver gear 512 to the second output shaft 522. Thus, propulsive force passes through the second clutch mechanism 582, second output shaft 522, synchronizer mechanism 589 and second driver gear 512 to the second final drive pinion 532, output layshaft 536, output gear 534, and on to the final drive output 535. For operation of the VRO-EVT in a ReEV-BEV mode in reverse, the first clutch mechanism 581 is deactivated and the second clutch mechanism 582 is activated. In addition, the synchronizer mechanism 589 is moved longitudinally along the second output shaft 522 and into contact with the reverse driver gear 513, thereby non-rotatably affixing the reverse driver gear 513 to the second output shaft 522. Thus, propulsive force passes through the second clutch mechanism 582, second output shaft 522, synchronizer mechanism 589 and reverse driver gear 513 to the reverse idler gear 514, reverse final drive pinion 533, output layshaft 536, output gear 534, and on to the final drive output 535.

When used in a ReEV and operating in a BEV mode, the VRO-EVT may also be configured such that both motors EMA 591 and EMB 592 provide propulsive force. In this configuration, the third clutch assembly 583 is deactivated and the fourth clutch assembly 584 is activated. In order for EMA 591 and EMB 592 to both provide propulsive force, one of the carrier 544 or pinion gears 542 of the input-split planetary gear set 504 must be non-rotatably fixed in place. Typically, the carrier 544 will be prevented from rotating. Thus, propulsive force travels from EMA 591 through the sun gear 541, pinion gear 542, ring gear 543, and clutch 584. EMB 592 then supplements the propulsive force of EMA 591 and the combined propulsive force travels through shaft 553 to the first clutch mechanism 581 and second clutch mechanism 582. At this point, for operation of the VRO-EVT in a ReEV-BEV mode utilizing both EMA 591 and EMB 592 in a first gear ratio ("ReEV as BEV3"), the first clutch mechanism 581 is activated and the second clutch mechanism 582 is deactivated. Thus, propulsive force passes through the first clutch mechanism 581, first output shaft 521, and first driver gear 511 to the first final drive pinion 531, output layshaft 536, output gear 534, and on to the final drive output 535. For operation of the VRO-EVT in a ReEV-BEV mode utilizing both EMA 591 and EMB 592 in a second gear ratio ("ReEV as BEV4"), the first clutch mechanism 581 is deactivated and the second clutch mechanism 582 is activated. In addition, the synchronizer mechanism 589 is moved longitudinally along the second output shaft 522 and into contact with the second driver gear 512, thereby non-rotatably affixing the second driver gear 512 to the second output shaft 522. Thus, propulsive force passes through the second clutch mechanism 582, second output shaft 522, synchronizer mechanism 589 and second driver gear 512 to the second final drive pinion 532, output layshaft 536, output gear 534, and on to the final drive output 535. For operation of the VRO-EVT in a ReEV-BEV mode utilizing both EMA 591 and EMB 592 in reverse, the first clutch mechanism 581 is deactivated and the second clutch mechanism 582 is activated. In addition, the synchronizer mechanism 589 is moved longitudinally along the second output shaft 522 and into contact with the reverse driver gear 513, thereby non-rotatably affixing the reverse driver gear 513 to the second output shaft 522. Thus, propulsive force passes through the second clutch mechanism 582, second output shaft 522, synchronizer mechanism 589 and reverse driver gear 513 to the reverse idler gear 514, reverse final drive pinion 533, output layshaft 536, output gear 534, and on to the final drive output 535.

The VRO-EVT may also be configured for use in a series ReEV ("ReEV as Series") in which the engine 501 rotates EMA 591 in order to generate electricity to power EMB 592 and provide propulsive force for a vehicle. Still referring to FIGS. 5 and 6, when the VRO-EVT is to be operated as a series ReEV utilizing EMA 591 as a generator and EMB 592 as the propulsion source, the third clutch mechanism 583 is activated, thereby locking the ring gear 543 to ground 593 and the fourth clutch mechanism 584 is deactivated. This clutch activation state of the third clutch mechanism 583 and fourth clutch mechanism 584 configures the VRO-EVT to utilize EMA 591 as a generator and EMB 592 as the propulsion source. The engine 501 provides the torque to spin EMA 591 as a generator. To do so, the engine 501 applies a torque to shaft 502 which causes the carrier 544 to rotate. The sun gear 541, to which EMA 591 is affixed, is forced to rotate by the pinion gears 542 because the ring gear 543 is locked in place. At this point, for operation of the VRO-EVT in a series ReEV in a first gear ratio, the first clutch mechanism 581 is activated and the second clutch mechanism 582 is deactivated. Thus, propulsive force passes through the first clutch mechanism 581, first output shaft 521, and first driver gear 511 to the first final drive pinion 531, output layshaft 536, output gear 534, and on to the final drive output 535. For operation of the VRO-EVT in a series ReEV in a second gear ratio, the first clutch mechanism 581 is deactivated and the second clutch mechanism 582 is activated. In addition, the synchronizer mechanism 589 is moved longitudinally along the second output shaft 522 and into contact with the second driver gear 512, thereby non-rotatably affixing the second driver gear 512 to the second output shaft 522. Thus, propulsive force passes through the second clutch mechanism 582, second output shaft 522, synchronizer mechanism 589 and second driver gear 512 to the second final drive pinion 532, output layshaft 536, output gear 534, and on to the final drive output 535. For operation of the VRO-EVT in a series ReEV in reverse, the first clutch mechanism 581 is deactivated and the second clutch mechanism 582 is activated. In addition, the synchronizer mechanism 589 is moved longitudinally along the second output shaft 522 and into contact with the reverse driver gear 513, thereby non-rotatably affixing the reverse driver gear 513 to the second output shaft 522. Thus, propulsive force passes through the second clutch mechanism 582, second output shaft 522, synchronizer mechanism 589 and reverse driver gear 513 to the reverse idler gear 514, reverse final drive pinion 533, output layshaft 536, output gear 534, and on to the final drive output 535.

Still referring to FIG. 6, the VRO-EVT may be operated as a parallel ReEV ("ReEV as EVT HEV") in which both the engine 501 and EMB 592 provide propulsive force and EMA 591 generates electricity. The clutch activation states and power flows within the VRO-EVT when operated as a parallel ReEV are identical to those described with respect to operation of the VRO-EVT as a HEV. In addition, it is contemplated that the VRO-EVT may be used in a plug-in hybrid electric vehicle ("PHEV"). As with the ReEV, the clutch activation states and power flows within the VRO-EVT when operated as a PHEV are identical to those described with respect to operation of the VRO-EVT as a HEV.

While the disclosed multi-range gearing mechanism of FIGS. 2 and 5 is shown with two forward gear ratios, the multi-range gearing mechanism is not so limited. Any number of forward and/or reverse gear ratios and corresponding clutches and synchronizer mechanisms may be included within the multi-range gearing mechanism as desired. The gear ratios and corresponding final drive ratios may be selected to be any desired underdrive or overdrive ratio as would be readily apparent to one of skill in the art to achieve the desired engine efficiency, power band and/or vehicle performance. In addition, any type of clutching mechanism or arrangement may be utilized within the multi-range gearing mechanism as would be known to one of skill in the art. For instance, the VRO-EVT may utilize dry clutches, wet clutches, multi-plate clutches, dog clutches, synchronizer mechanisms, dual clutches as found in a conventional dry dual clutch transmission, or any other known clutching mechanism to achieve the disclosed clutching action. The clutching mechanisms may be located on the first and second output shafts, the output layshaft, or any combination of the three. Further, planetary gear sets may be used in place of the layshaft arrangement. For example, referring to FIG. 2, the first driver gear 11/first driven gear 21 combination may be replaced by a first planetary gear set and the second driver gear 12/second driven gear 22 may be replaced by a second planetary gear set. Moreover, the disclosed VRO-EVT of FIGS. 2 and 5 are shown at an exemplary cross-section. It would be known to one of skill in the art that the axis of the transmission input shaft 2, 502, output layshaft 36, 536 and final drive output 35, 535 need not all lie within the same plane and may be placed within any suitable orientation to one another.

Further, while the disclosed VRO-EVTs of FIGS. 2 and 5 are shown with the multi-range gearing mechanism coupled to an input-split EVT, the multi-range gearing mechanism is not so limited. Rather, the multi-range gearing mechanism may be coupled any type of EVT. For instance, the multi-speed gearing mechanism may be coupled to output of a compound-split EVT, output-split EVT, or any other type of EVT.

Thus, the disclosed VRO-EVT may be operated at high speeds without suffering a dramatic loss in efficiency. In addition, because the final drive ratio of the VRO-EVT may be changed by selectively activating or deactivating the first clutch and second clutch mechanisms 81, 82, the VRO-EVT may be configured with optimum performance for both city and highway driving. Further, because a shorter gear ratio may be used for city driving, the VRO-EVT may be equipped with lower torque motors saving both cost and space within the transmission. Conversely, because a taller gear ratio may be used for highway use, the transmission may utilize this gear ratio during electric vehicle operation to allow for higher vehicle speeds. The VRO-EVT may also be equipped with a reverse gear and idler system that allows engine power to supplement the power provided by electric motor A and electric motor B when the VRO-EVT is operated in reverse.

One advantage of the disclosed embodiments is that an improved final drive gear ratio is provided for the VRO-EVT. The VRO-EVT may be operated in its desired efficiency and/or performance range more frequently while still providing optimum city and highway vehicle performance. Further, the transmission allows for increased vehicle speeds during electric vehicle operation and allows the engine to optionally provide propulsive force during reverse operation. The VRO-EVT has a variable-range output mechanism that achieves the desired gear ratio spread and optional reverse gear operation.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology and are intended to be covered by the following claims.

What is claimed is:

1. A transmission comprising:
a transmission input shaft;
a planetary gear set comprising:
a sun gear,
at least one pinion gear meshed with the sun gear, the at least one pinion gear coupled to the transmission input shaft by a carrier, and
a ring gear continuously meshed with the at least one pinion gear;
a first electric motor coupled to the sun gear;
a second electric motor selectively coupled to the ring gear;
a first driver gear and a second driver gear, wherein the second electric motor is selectively coupled to the first driver gear to provide a first output gear ratio and selectively coupled to the second driver gear to provide a second output gear ratio;
a reverse driver gear selectively coupled to the second electric motor; and
a reverse idler gear continuously meshed with the reverse driver gear to provide a reverse gear ratio.

2. The transmission of claim 1, wherein the ring gear is selectively coupled to ground.

3. The transmission of claim 1, wherein the selectively coupling is performed by a plurality of clutch mechanisms.

4. The transmission of claim 3, wherein the clutch mechanisms are chosen from the group consisting of dry clutches, wet clutches, multi-plate clutches, dog clutches, synchronizer mechanisms, or dual clutches.

5. A transmission comprising:
a transmission input shaft;
a planetary gear set comprising:
a sun gear,
at least one pinion gear continuously meshed with the sun gear, the at least one pinion gear coupled to the transmission input shaft by a carrier, and
a ring gear continuously meshed with the at least one pinion gear;
a first electric motor coupled to the sun gear;
a second electric motor selectively coupled to the ring gear, wherein:
the second electric motor is selectively coupled by a first clutch mechanism to a first driver gear,
the second electric motor is selectively coupled by a second clutch mechanism to a second driver gear, and
the second electric motor is selectively coupled by a third clutch mechanism to the ring gear;
an output layshaft, the output layshaft comprising:
a first final drive pinion coupled to the output layshaft and continuously meshed with the first driver gear,
a second final drive pinion coupled to the output layshaft and continuously meshed with the second driver gear, and
an output gear coupled to the output layshaft;
a reverse final drive pinion selectively coupled by a fourth clutch mechanism to the second electric motor; and a reverse idler gear continuously meshed with the reverse driver gear, wherein the output layshaft further comprises a reverse final drive pinion coupled to the output layshaft and continuously meshed with the reverse idler gear.

6. The transmission of claim 5, further comprising a fifth clutch mechanism selectively coupling the ring gear to ground.

7. The transmission of claim 5, wherein the first clutch mechanism and the second clutch mechanism are the same.

8. The transmission of claim 5, wherein the fourth clutch mechanism selectively couples the second electric motor to the second driver gear.

\* \* \* \* \*